United States Patent
Morliere et al.

(10) Patent No.: US 11,274,568 B2
(45) Date of Patent: Mar. 15, 2022

(54) COOLING DEVICE FOR A TURBINE OF A TURBOMACHINE

(71) Applicant: SAFRAN AIRCRAFT ENGINES, Paris (FR)

(72) Inventors: Simon Nicolas Morliere, Moissy-Cramayel (FR); Julian Nicolas Girardeau, Moissy-Cramayel (FR); Sébastien Jean Laurent Prestel, Moissy-Cramayel (FR); Ghislain Hervé Abadie, Moissy-Cramayel (FR); Benjamin Franklin François Gillot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/045,229

(22) PCT Filed: Mar. 28, 2019

(86) PCT No.: PCT/FR2019/050714
§ 371 (c)(1),
(2) Date: Oct. 5, 2020

(87) PCT Pub. No.: WO2019/193267
PCT Pub. Date: Oct. 10, 2019

(65) Prior Publication Data
US 2021/0164362 A1 Jun. 3, 2021

(30) Foreign Application Priority Data
Apr. 3, 2018 (FR) .................................. FR1852873

(51) Int. Cl.
*F01D 11/24* (2006.01)

(52) U.S. Cl.
CPC .......... *F01D 11/24* (2013.01); *F05D 2260/30* (2013.01)

(58) Field of Classification Search
CPC ........................ F01D 11/20–11/24; F01D 5/12
See application file for complete search history.

(56) References Cited

U.S. PATENT DOCUMENTS

| | | | |
|---|---|---|---|
| 6,185,925 B1 * | 2/2001 | Proctor | F01D 11/24 60/806 |
| 2012/0049029 A1 * | 3/2012 | Ziegler | F16L 3/00 248/309.1 |

(Continued)

FOREIGN PATENT DOCUMENTS

| | | | |
|---|---|---|---|
| FR | 2995022 A1 * | 3/2014 | F02C 7/18 |
| FR | 3 002 590 A1 | 8/2014 | |

(Continued)

OTHER PUBLICATIONS

International Patent Application No. PCT/FR2019/050714, International Search Report and Written Opinion dated Jun. 27, 2019, 15 pgs.

*Primary Examiner* — Topaz L. Elliott
(74) *Attorney, Agent, or Firm* — Lathrop GPM LLP

(57) ABSTRACT

Cooling device (21) extending circumferentially around a turbomachine casing, such as a turbine casing, comprising a support (24) extending axially and designed to be secured to the casing, at least one cooling tube extending circumferentially, at least one securing member (25), comprising a radially inner portion (36) at least partially surrounding the tube, and a radially outer portion (37) secured to the support (24), the radially outer portion (37) of the securing member (25) being secured to the support (24) via the intermediary of a connection member (30) comprising a central portion (31) having a circumferential end portion (32) and a second circumferential end portion (32) which are circumferentially (Continued)

opposite, the first end portion (32) and the second end portion (32) each extending in an opposite axial direction, the first and second end portions (32, 32) each being secured to the support (24), the radially outer portion (37) of the securing member (25) being secured to the central portion (31) of the connection member (30).

19 Claims, 4 Drawing Sheets

(56) References Cited

U.S. PATENT DOCUMENTS

| | | |
|---|---|---|
| 2015/0345328 A1 | 12/2015 | Prestel |
| 2016/0003088 A1* | 1/2016 | Cohin .................... F16L 3/221 60/806 |
| 2019/0226357 A1* | 7/2019 | Beauquin ............... F01D 25/14 |
| 2020/0271057 A1* | 8/2020 | Evain ..................... F01D 25/28 |
| 2021/0164361 A1* | 6/2021 | Morliere ................ F01D 25/12 |

FOREIGN PATENT DOCUMENTS

| | | |
|---|---|---|
| FR | 3 021 700 A1 | 12/2015 |
| WO | WO 2010/122120 A1 | 10/2010 |

\* cited by examiner

COOLING DEVICE FOR A TURBINE OF A TURBOMACHINE

CROSS-REFERENCE TO RELATED APPLICATIONS

This application is a 35 U.S.C. § 371 filing of International Application No. PCT/FR2019/050714 filed Mar. 28, 2019, which claims the benefit of priority to French Patent Application No. 1852873 filed Apr. 3, 2018, each of which is incorporated herein by reference in its entirety.

FIELD OF THE INVENTION

This invention concerns a cooling device for a turbine of a turbo machine, such as an aircraft turbojet, in particular a dual-flow turbojet.

BACKGROUND OF THE INVENTION

FIG. 1 shows a turbomachine 1 with double flow and double spool. The axis of the turbomachine is referenced X and corresponds to the axis of rotation of the rotating parts. In the following, the terms axial and radial are defined in relation to the X axis.

Turbomachine 1 has, from upstream to downstream in the direction of gas flow, a blower 2, a low-pressure compressor 3, a high-pressure compressor 4, a combustion chamber 5, a high-pressure turbine 6 and a low-pressure turbine 7.

The air from fan 2 is divided into a primary flow 8 flowing into a primary annular vein 9, and a secondary flow 10 flowing into a secondary annular vein 11 surrounding the primary annular vein 10.

The low-pressure compressor 3, high-pressure compressor 4, combustion chamber 5, high-pressure turbine 6 and low-pressure turbine 7 are located in primary vein 9.

The rotor of the high pressure turbine 6 and the rotor of the high pressure compressor 4 are coupled in rotation via a first shaft 12 in order to form a high pressure body.

The rotor of the low-pressure turbine 7 and the rotor of the low-pressure compressor 3 are coupled in rotation via a second shaft 13 in order to form a low-pressure body, the blower 2 being able to be connected directly to the rotor of the low-pressure compressor 3 or via an epicyclic gear train for example.

As is best seen in FIG. 2, the low-pressure turbine 7 has in particular different successive stages with moving wheels 14 and fixed parts. The impeller has a disc 15 on which blades 16 are mounted. The ends of the blades 16 are surrounded by a fixed ring 17 made of abradable material, said ring 17 being fixed on the turbine casing 18. Valves 19 are located downstream of the impellers 14. Valves 19 and rings 17 are mounted on the casing by means of flanges or hooks 20 extending from the radially inner surface of the casing 18.

In order to guarantee a high efficiency of the turbo machine, the air flow not passing through the impellers of the individual stages must be limited, i.e. leaks between the radially outer ends of the blades 16 and the ring 17 made of abradable material must be limited. To do this, the clearance must be checked at this interface, as this clearance is dependent on the temperature of casing 18, and in particular on the areas of said casing 18 containing the hooks or flanges 20 supporting ring 17.

The primary air flow from combustion chamber 5 is hot and heats the downstream parts, such as the fixed and mobile parts of the turbine 6, 7.

In order to control the above-mentioned clearance and to avoid any premature degradation of the various stationary and mobile parts of the turbine, it is necessary to provide effective cooling means that can be easily integrated into the environment of the turbomachine.

The patent application FR 3 021 700, on behalf of the applicant, discloses a cooling device 21 of a low-pressure turbine 7 casing 18, visible in FIG. 3, with collector boxes 22, each collector box 22 forming an axially extending channel.

The device 21 also includes tubes 23 extending circumferentially on either side of the collector boxes 22. These tubes 23, also called ramps, are formed by curved pipes of circular cross-section, each tube 23 extending circumferentially around the casing, for example at an angle of about 90°.

Each tube 23 has an air inlet opening into the channel of the corresponding collector box 22 and a closed distal end. Each tube 23 also has a cylindrical wall with air ejection openings facing casing 18, so that cooling air can enter the manifolds 22 and then the tubes 23 before opening through the openings facing casing 18 to cool it. This is known as impact cooling because the air impacts the casing 18.

All tubes 23 are held together on the casing 18 by means of supports 24 extending in the axis of the turbomachine, and thanks to hooks of fixing devices 25, located at different points on the circumference of the casing 18.

Document FR 3 002 590, on behalf of the applicant, discloses an embodiment in which the fixing devices comprise a radially inner part at least partially surrounding the corresponding tube and a radially outer part extending radially, fixed to a fixing lug of the support. Said fixing lug is made by cutting and bending a part of the support. Circular holes are provided in said lug and in the corresponding fixing device, said holes allowing the passage of a fastening screw cooperating with a nut.

It has been found that it is difficult to control the exact position of the tabs after bending, making it difficult to control the radial and axial position of the hooks and thus the ramps used for cooling the relevant areas of the casing, which affects the cooling efficiency. In addition, it is possible that the radially inner parts of the tubes may come into contact with the outer surface of the casing due to the thermal, mechanical and vibratory stresses applied during operation. The force exerted by the casing on the tubes is transmitted to the tabs via the fixing devices, which can result in irreversible plastic deformation of the tabs or even the fixing devices, making it impossible to position the tubes radially and axially correctly in relation to the casing at a later date.

SUMMARY OF THE INVENTION

The invention more particularly aims at providing a simple, efficient and cost-effective solution to these problems.

For this purpose, it provides a cooling device extending circumferentially around a turbomachine casing, such as a turbine casing, comprising:
  an axially extending support for attachment to the casing,
  at least one circumferentially extending cooling tube,
  at least one fixing device, comprising a radially inner portion at least partly surrounding the pipe, and a radially outer portion fixed to the support, characterised in that the radially outer portion of the fixing device is fixed to the support via a connecting member comprising a central portion having a first circumferential end portion and a second circumferential end portion which are circumferentially opposite, the first end portion and the second end portion each extending in an opposite axial direction, the first and second end portions each being fixed to the support, the radially outer portion of the fixing member being fixed to the central portion of the connecting member.

The connecting element thus has a general Z-shape, giving it a good resistance to bending and twisting, so that the correct positioning of the fixing members in relation to the support, and therefore the correct positioning of the tubes in relation to the casing, is guaranteed.

This bending and twisting resistance of the connecting element also prevents the connecting element from deforming plastically if the tubes come into contact with the casing.

In addition, the use of a connecting member separate from the support allows better control of the manufacture of the various elements as well as the dimensional chain enabling the tubes to be precisely positioned in relation to the casing, both axially and radially.

The support can extend mainly axially.

The radially outer part of the fixing member can be attached to the support in an area radially outside an outer face of the support. The outer face of the support is opposite to an inner face of the support which is facing or oriented towards the casing.

The connecting element can be formed by a folded sheet metal.

The end parts of the connecting member can be attached to the support by means of rivets.

Alternatively, said end parts of the connecting member can be fixed to the support by welding.

The radially outer part of the fixing device can be attached to the connecting member by means of at least one axially extending screw or rivet.

Since the screw does not extend in the radial direction, it is possible to increase the diameter of the corresponding tube and the radially inner part of the fixing device surrounding the tube without these elements interfering with the screw.

The central part of the connecting member may have an oblong hole extending radially, said screw or rivet being engaged in said oblong hole.

This allows the fixing devices and tubes to move radially in relation to the support and connecting member. In other words, it is possible to control the radial position of the tubes in relation to the casing, before screwing or riveting, which makes it possible to effectively control the cooling of the casing.

The device may comprise at least two tubes extending circumferentially and axially spaced apart, each tube being attached to a fixing member, the radially outer part of each fixing device being attached to the central part of a respective connecting member.

Said radially outer parts of the fixing members may be fixed axially on either side of the central part of the connecting member.

The fixing devices for fastening two adjacent tubes may be arranged symmetrically, one with respect to the other, with respect to a radial plane extending between said fixing devices.

This arrangement reduces the axial space requirement for these elements.

Each fixing device may have a substantially circular portion surrounding the tube, and a fastening portion extending radially outwardly from the circular portion and forming a fastening lug. The circular part is then radially inner while the fastening lug is radially outer.

The support may have an axially extending main wall in which the lumen is formed, the support having at least one stop portion extending axially between two portions of said lumen and extending, at least in part, radially outwardly from the main wall.

The stop part may extend in a plane offset radially outwards from the main wall and have two circumferential ends connected to the corresponding edges of the lumen by connecting areas.

In this way, in the case where the casing comes to rest on the tubes or on the internal parts of the fixing devices, the stop part is able to limit the displacement of the internal part of the corresponding fixing device, so as to control the deformation of the radial parts of the connecting member and of the fixing device, in order to avoid plastic deformation of said radial parts.

Each lumen in the support may be oblong in shape and extend axially. Each lumen of the support can have a general rectangular shape.

An axially extending spacer can be mounted between the radially outer part of at least one fixing device and the connecting device. Each spacer can be tubular.

The length of the spacer can be selected to control the axial position of the tubes in relation to the casing. The use of spacers also makes it possible to use standard components, as the axial positioning corrections of the tubes in relation to the casing can be achieved individually by using spacers of different sizes.

The support may have at least one lumen located radially opposite the radially inner part of the fixing member or fixing members.

The support may have a main wall extending axially, with flanges extending radially outward from the side edges of the main wall.

Such a structure makes it possible to improve the dynamic behaviour of the support during the operation of the turbomachine by making it less sensitive to vibrations.

The support may have attachment areas extending radially outward beyond the flanges, with the axial parts of the connecting member attached to the attachment areas of the support.

The connecting member may be located circumferentially between the flanges, at least partially.

The invention also relates to an assembly comprising an annular casing of a turbomachine, for example an annular turbine casing, characterised in that it comprises a cooling device of the aforementioned type, fixed to said casing and surrounding said casing.

The invention also relates to a turbomachine comprising an assembly of the aforementioned type.

The invention will be better understood and other details, characteristics and advantages of the invention will appear when reading the following description, which is given as a non-limiting example, with reference to the attached drawings.

DETAILED DESCRIPTION

Figure 1:
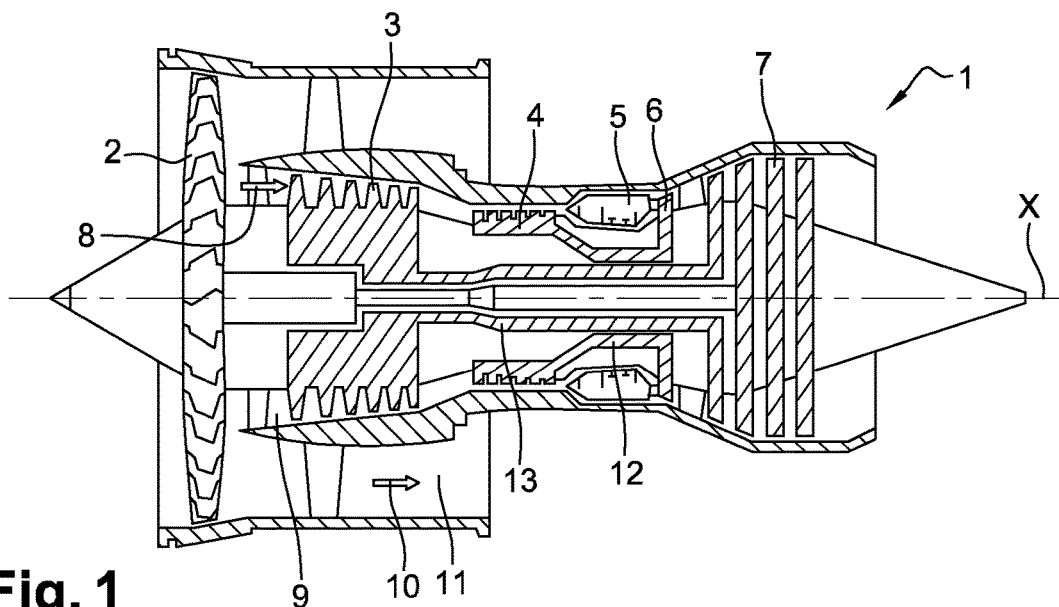
FIG. 1 is an axial cross-sectional view of a double-flow turbojet engine of the prior art.
Figure 2:
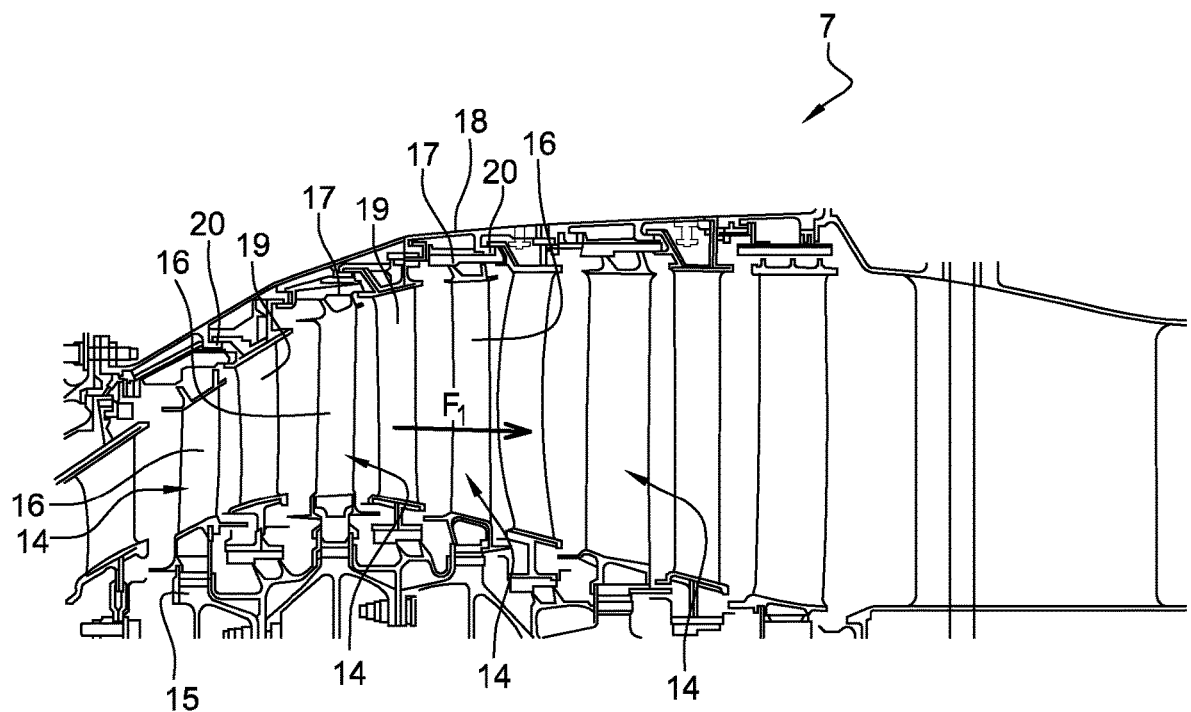
FIG. 2 is an axial cross-sectional view of a part of the turbojet engine of the prior art, illustrating in particular the low-pressure turbine.
Figure 3:
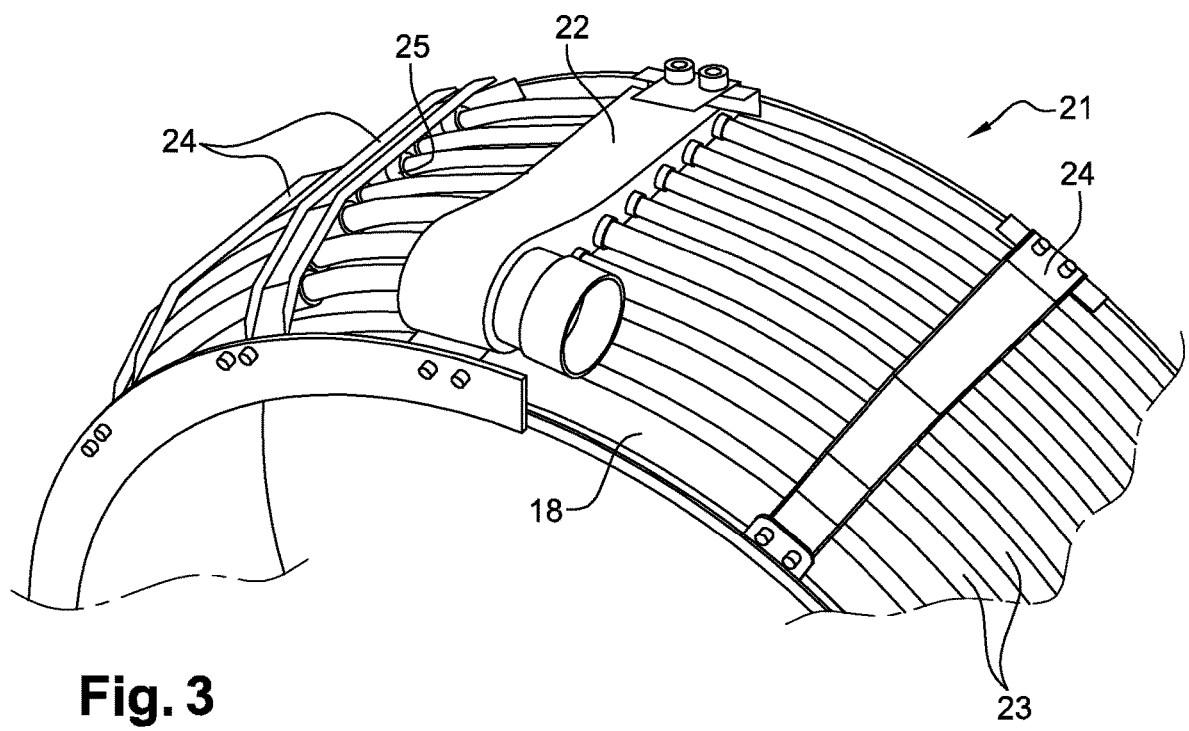
FIG. 3 is a perspective view of a cooling device of the prior art.
Figure 4:
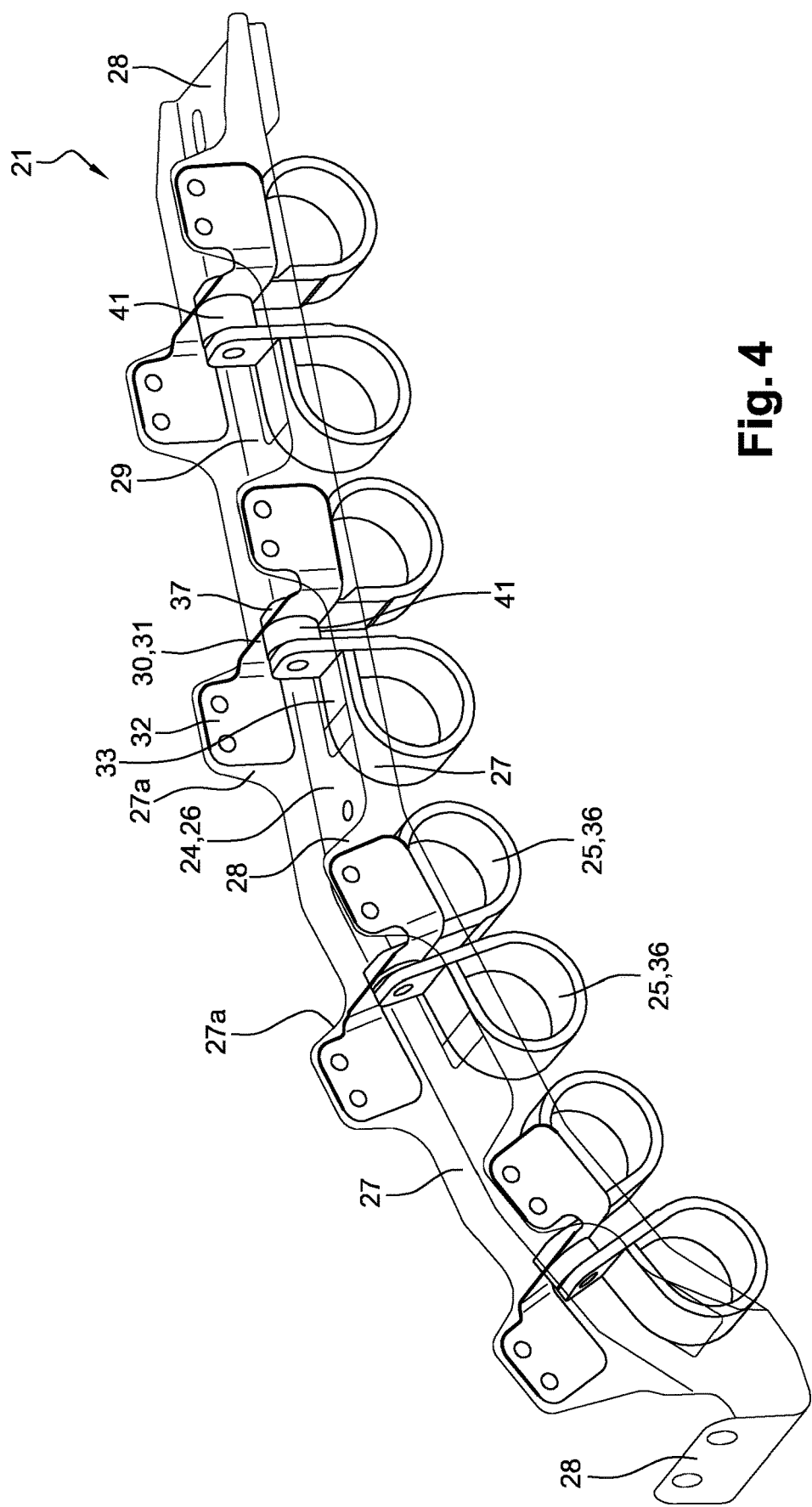
FIG. 4 is a perspective view of a part of a cooling device according to an embodiment of the invention.
Figure 5:
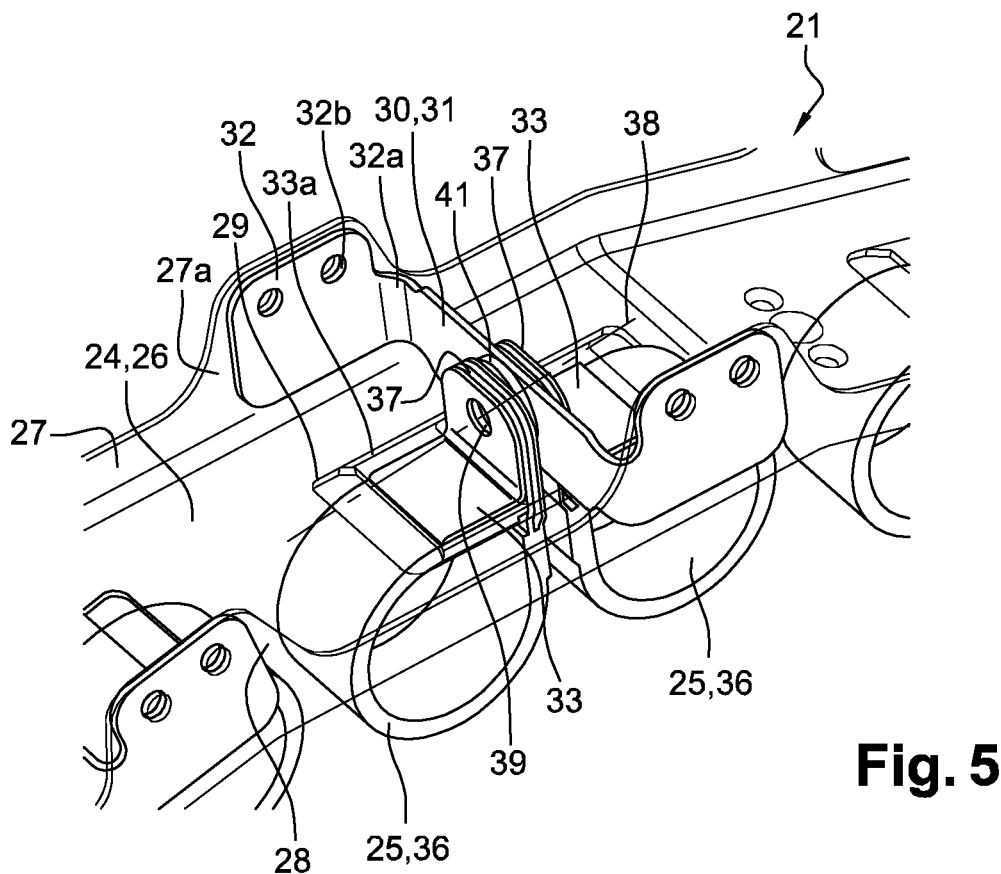
FIG. 5 is a detailed view of FIG. 4.

FIGS. 4 and 5 illustrate a part of a cooling device 21 designed to be mounted on a low-pressure turbine 7 casing 18 of an aircraft turbomachine 1, according to an embodiment of the invention.

The cooling device 1 has a support 24 formed by cutting, folding and/or stamping a sheet metal and has an axially extending main wall 26, with flanges 27 extending radially outwards from the side edges of the main wall 26. Fixing areas or lobes 27a extend radially outward from the free radial ends of the flanges 27.

The axial ends of the main wall 26 have fixing areas 28 for fixing to casing flanges.

Note that the fixing areas 28 may extend radially and/or axially. In the embodiment shown in the figures, one of the fixing areas 28 extending radially, the other fixing area 28 extending axially.

The main wall 26 has lumens 29 generally rectangular in shape, here four lumens 29 evenly distributed along the main wall. Lumens 29 extend along the axis of support 24.

For each lumen 29, the support 24 has two stop parts 33 extending between two side edges of the lumen 29, i.e. extending circumferentially, said stop parts 33 extending, at least in part, radially outside the main wall 26. In other words, two lumen parts 29 extend axially on either side of the stop parts 33.

Each stop part 33 extends in a plane offset radially outwards from the main wall 26 and has two circumferential ends connected to the corresponding edges 29a of the lumen 29 by connecting areas 33a forming camberings.

The stop parts 33 can be made by stamping.

Figure 6:
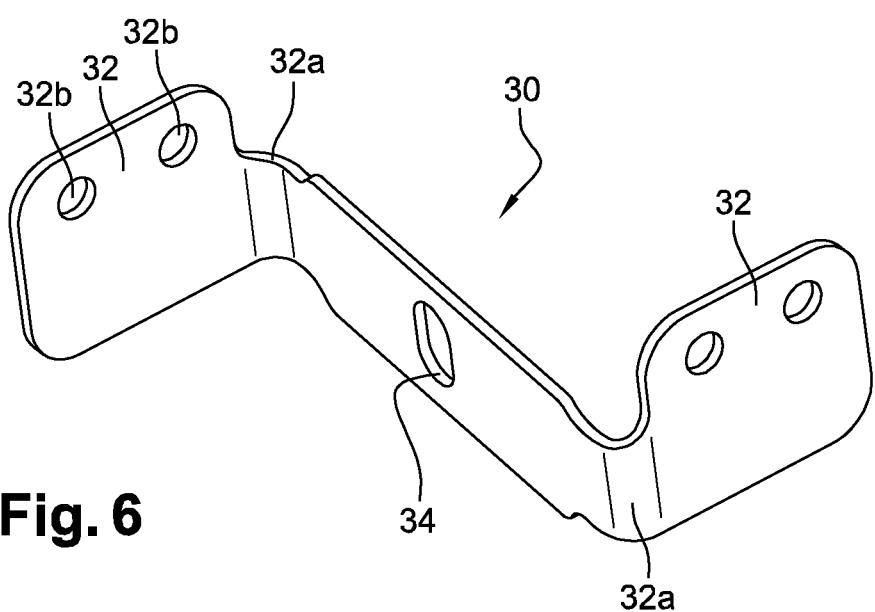
FIG. 6 is a perspective view of a connecting device.

The cooling device 1 also has connecting elements 30, which are formed by sheet metal, here four connecting elements 30. As is best seen in FIG. 6, each connecting member 30 has a central portion 31 extending in a radial plane and two end portions 32 configured to attach the connecting member 30 to the support and which extend in axial planes on either side of the radial plane of the central portion 31 from a first circumferential end and a second circumferential end of the central portion 31, respectively. The connecting areas 32a between the end parts 32 and the central part 31 can be rounded or curved. The connecting areas 32a here have a radial dimension that is smaller than the radial dimension of the central part 31, which in turn is smaller than the radial dimension of each of the end parts 32.

Each end part 32 has at least two holes 32b, here two circular holes, allowing the engagement of rivets not shown, which are used to attach the end parts 32 to the attachment areas 28 of the support 24.

The central part 31 of each connecting member 30 has a radially extending oblong hole 34.

The connecting element 30 is obtained by cutting and bending a sheet metal.

Cooling device 1 also has fixing devices 25, here four pairs of fixing devices 25. Each fixing device 25 comprises a radially inner part 36, circular in shape, at least partially surrounding the corresponding tube 23, and a radially outer part 37 forming a radially extending fastening lug 37.

In the embodiment shown in the figures, each fixing device 25 is obtained by bending a sheet metal plate, the fastening lug 37 is then formed by the two ends of the sheet metal, which are plated one on top of the other. This makes it easier to insert the tubes 23 into the inner part 36 of the fixing devices 25. In the remainder of the description, these two ends are considered to form a single element, i.e. fastening lug 37. Of course, any other embodiment of the fixing devices 25 can be considered.

A hole is made in fastening lug 37, the hole being for example circular.

The fixing devices 25 of a pair are arranged symmetrically next to each other. In particular, the fixing devices 25 can be oriented symmetrically to each other, with respect to a radial plane parallel to the external parts 37 of the fixing devices. The two fixing devices 25 can have identical structures, which limits the number of part numbers and assembly errors.

The radially outer parts 37 of the fixing members 25 of a same pair are attached to the central part 31 of the connecting member 30, respectively on either side axially of the central part 31. Note that the inner part 36 of each fixing device 25 extends axially on only one side of the radial plane defined by the corresponding outer part 37. The inner diameter of the inner part 36 of each fixing device 25 corresponds approximately to the outer diameter of the corresponding tube 23.

The outer parts or lugs 37 are fixed to the central part 31 of the corresponding connecting member 30 by means of a screw and a nut inserted along an axis schematised by a line referenced 38 in FIG. 5, this axis extends axially through the connecting member 30. The screw extends axially through the holes 39 in the lugs 37 and the oblong holes in the connecting element 30. The head of the screw is supported on the lug 37 of one of the fixing devices 25 of a pair, the nut is supported on the lug 37 of the other fixing device 25 of said pair.

This makes it possible to control the radial position of the fixing devices 25 and tubes 23 in relation to the support 24 and the connecting member 30. In other words, it is possible to control the radial position of the tubes 23 in relation to the casing 18, before screwing or riveting, by radial displacement of screw 38 in the oblong hole 34.

An axially extending spacer 41 may be provided between at least one of the lugs 37 and the central part 31 of the connecting member 30. Of course, a spacer 41 may be provided between each lug 37 and the central part 31 of the connecting member 30.

The length of the spacer 41 can be selected to control the axial position of the tubes 23 in relation to the casing 18.

If the casing 18 comes to rest on the tubes 23 or on the inner parts 36 of the fixing devices 25, the radially inner parts 36 of the fixing devices 36 are able to come to rest on the stop parts 33 of the support through the corresponding lumen 29. This limits the deformation of the fixing devices 25 so that no plastic deformation said elements can occur. It should be noted that the formation of lumens 29 in the main wall 26 allows to reduce the mass of the support 24 and limits the vibration contact between the fixing members 25 and the support 24.

The invention claimed is:

1. A cooling device configured to extend circumferentially around a casing of a turbomachine, comprising:
   an axially extending support for attachment to the casing,
   at least one circumferentially extending cooling tube,
   at least one fixing device, comprising a radially inner part at least partly surrounding the tube, and a radially outer part fixed to the support, characterised in that the radially outer portion of each fixing device is fixed to the support via a connecting member, each connecting member comprising a central portion having a first circumferential end portion and a second circumferential end portion which are circumferentially opposite, the first end portion and the second end portion each extending in an opposite axial direction, the first and second end portions each being fixed to the support, the radially outer part of each fixing device being fixed to the central portion of a respective one of the at least one connecting member.

2. The cooling device according to claim 1, characterised in that each connecting member is formed by a folded sheet metal.

3. The cooling device according to claim 2, characterised in that the end portions of the at least one connecting member are fastened to the support by means of rivets.

4. The cooling device according to claim 2, characterised in that the radially outer part of each fixing device is fastened to the respective connecting member by means of at least one axially extending screw or rivet.

5. The cooling device according to claim 2, comprising at least two of the tubes extending circumferentially and axially spaced apart, each tube being attached to at least one of said at least one fixing device, the radially outer part of each fixing device being attached to the central part portion of a respective one of the at least one connecting member.

6. The cooling device according to claim 1, characterised in that the end portions of the at least one connecting member are fastened to the support by means of rivets.

7. The cooling device according to claim 6, characterised in that the radially outer part of each fixing device is to the respective connecting member by means of at least one axially extending screw or rivet.

8. The cooling device according to claim 6, comprising at least two of the tubes extending circumferentially and axially spaced apart, each tube being attached to at least one of said at least one fixing device, the radially outer part of each fixing device being attached to the central portion of a respective one of the at least one connecting member.

9. The cooling device according to claim 6, characterised in that the support has at least one lumen located radially opposite the radially inner part of the fixing device or devices.

10. The cooling device according to claim 1, characterised in that the radially outer part of each fixing device is fastened to the respective connecting member by means of at least one axially extending screw or rivet.

11. The cooling device according to claim 10, characterised in that the central portion of each connecting member has a radially extending oblong hole, said at least one axially extending screw or rivet being engaged in said oblong hole.

12. The cooling device according to claim 11, comprising at least two of the tubes extending circumferentially and axially spaced apart, each tube being attached to at least one of said at least one fixing device, the radially outer part of each fixing device being attached to the central portion of a respective one of the at least one connecting member.

13. The cooling device according to claim 10, comprising at least two of the tubes extending circumferentially and axially spaced apart, each tube being attached to at least one of said at least one fixing device, the radially outer part of each fixing device being attached to the central portion of a respective one of the at least one connecting member.

14. The cooling device according to claim 10, characterised in that an axially extending spacer is mounted between the radially outer part of at least one of the at least one fixing device and the respective connecting member or members.

15. The cooling device according to claim 1, comprising at least two of the tubes extending circumferentially and axially spaced apart, each tube being attached to at least one of said at least one fixing device, the radially outer part of each fixing device being attached to the central portion of a respective one of the at least one connecting member.

16. The cooling device according to claim 1, characterised in that the support has at least one lumen located radially opposite the radially inner part of the fixing device or devices.

17. The cooling device according to claim 16, characterised in that the support has an axially extending main wall in which the at least one lumen is formed, the support having at least one stop portion extending axially between two portions of said lumens and extending, at least in part, radially outwardly from the main wall.

18. The cooling device according to claim 1, characterised in that an axially extending spacer is mounted between the radially outer part of at least one of the at least one fixing device and the respective connecting member or members.

19. An assembly comprising an annular casing of a turbomachine, and the cooling device according to claim 1, fixed to said casing and surrounding said casing.

* * * * *